United States Patent
Mansfield et al.

(10) Patent No.: US 11,984,566 B2
(45) Date of Patent: May 14, 2024

(54) BATTERY CELL GROUP CONDUCTIVE TEMPERATURE MEASUREMENT SYSTEM

(71) Applicant: GM GLOBAL TECHNOLOGY OPERATIONS LLC, Detroit, MI (US)

(72) Inventors: Seth P. Mansfield, Oak Park, MI (US); John M. Barnowsky, Royal Oak, MI (US); Ethan T. Quy, Royal Oak, MI (US); Matthew Pernot, Imlay City, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 108 days.

(21) Appl. No.: 17/677,393

(22) Filed: Feb. 22, 2022

(65) Prior Publication Data

US 2023/0268570 A1   Aug. 24, 2023

(51) Int. Cl.
*H01M 10/00* (2006.01)
*H01M 10/48* (2006.01)
*H01M 10/613* (2014.01)
*H01M 10/625* (2014.01)
*H01M 10/653* (2014.01)

(52) U.S. Cl.
CPC ....... *H01M 10/486* (2013.01); *H01M 10/613* (2015.04); *H01M 10/625* (2015.04); *H01M 10/653* (2015.04); *H01M 2220/20* (2013.01)

(58) Field of Classification Search
CPC ............ H01M 10/486; H01M 10/613; H01M 10/625; H01M 10/653; H01M 2220/20
See application file for complete search history.

(56) References Cited

U.S. PATENT DOCUMENTS

| | | |
|---|---|---|
| 9,648,538 B2 | 5/2017 | Ganesan |
| 9,992,735 B1 | 6/2018 | Crosbie et al. |
| 10,887,808 B1 | 1/2021 | McPhee et al. |
| 11,089,529 B1 | 8/2021 | Lekutai |
| 2010/0164790 A1 | 7/2010 | Wisnewski et al. |
| 2017/0328783 A1* | 11/2017 | Okamoto ............ H01M 50/528 |
| 2019/0148800 A1* | 5/2019 | Toth .................... H01M 50/213 320/153 |
| 2019/0237817 A1* | 8/2019 | Hammerschmied ......................... H01M 10/425 |

* cited by examiner

*Primary Examiner* — Nicholas P D'Aniello
(74) *Attorney, Agent, or Firm* — Quinn IP Law

(57) ABSTRACT

A cell temperature measurement system for a battery includes a heat spreader and a temperature sensor. The heat spreader is configured to thermally conduct energy through a substrate from a cell contact to a sensor contact. The temperature sensor is configured to generate a measurement reflective of a cell or another component temperature of the battery. The temperature sensor may generate the temperature measurement according to readings taken with a probe positioned proximate the sensor contact.

20 Claims, 5 Drawing Sheets

BATTERY CELL GROUP CONDUCTIVE TEMPERATURE MEASUREMENT SYSTEM

INTRODUCTION

A battery is a device that converts chemical energy into electrical energy by means of electrochemical reduction-oxidation (redox) reactions. In secondary or rechargeable batteries, these electrochemical reactions are reversible, which allows the batteries to undergo multiple charging and discharge cycles. Electric vehicles, including hybrid electric vehicles, are powered by electric motors or generators that, in turn, are typically powered by onboard rechargeable batteries. Such batteries typically include multiple individual electrochemical cells (referred to herein as battery cells) arranged in series and/or parallel and positioned adjacent one another to form battery modules and/or battery packs that, when incorporated in a battery system of an electric vehicle, provide the vehicle with a combination of high voltage and high capacity.

Rechargeable batteries employed in electric vehicles internally generate heat under normal charging and discharge operations. To optimize the performance and life of such batteries, it is beneficial to implement cooling systems that effectively transfer heat away from the battery cells during operation to maintain the temperature of the battery cells within a desirable operating temperature range. The capability of the cooling system to efficiently transfer heat away from the battery cells and otherwise assist in maintaining the batteries at a desired temperature is dependent on a temperature measurement taken for the battery. The accuracy of the temperature measurement relative to the actual temperature of the battery, or in some cases individual cells within the battery, is important to maximize controllability of the cooling system and other vehicle systems having operations relatedly dependent on battery temperatures.

SUMMARY

Disclosed herein is a measurement system for measuring temperature of a battery, such as for use with a battery of the type having a plurality of battery cells arranged into battery cell groups or the like, as is commonly employed within electric driven/powered vehicles and equipment. While other sources of heat may be present, the battery cells are typically one of the most influential sources of heat within a battery, and consequently, one of the more relevant components for temperature measurement. Accurately ascertaining a temperature measurement for the battery cells may be difficult due to the battery cells frequently being included within an enclosure of some kind to provide physical and/or thermal isolation. As described in U.S. patent application Ser. No. 17/513,280, filed Oct. 28, 2021, and entitled Battery Including Enclosure For Battery Cell Groups, the disclosure of which is hereby incorporated by reference in its entirety herein, sealing the enclosure or otherwise providing limitations on the ability of heat, particulates, gases or other emissions to escape the enclosure or further influence surrounding componentry is relevant to desirable vehicle operations. The measurement system described herein contemplates measuring temperature of a battery cell disposed within an enclosure, and optionally, doing so without disrupting, or at least minimizing, disruption to sealing and containment capabilities of the enclosure.

The present teachings contemplate a cell temperature measurement system for a battery. The system may include a heat spreader configured to thermally conduct energy through a substrate from a cell contact to a sensor contact. The sensor contact may be at a distal end of the substrate, and the cell contact may be at a proximal end of the substrate. The system may also include a temperature sensor configured to generate a temperature measurement reflective of a cell temperature of the battery. The temperature sensor may include a probe proximate the sensor contact to facilitated generating the temperature measurement according to readings taken therewith.

The battery may be of the type having a plurality of battery cells stacked relative to one another. The cell contact may be attached with a cell adhesive to a housing of at least one of the battery cells.

The probe may be a thermistor surface mounted to a top of a circuit board. The circuit board may include an underside with a sensor trace exposed therethrough. The sensor trace may be thermally coupled to the thermistor and have a bottom surface pressed against the sensor contact.

The sensor contact may be attached to a sensor shield with a sensor adhesive. The sensor shield may include a first portion covering the circuit board and the thermistor and a second portion surrounding the first portion. The sensor adhesive may be attached between the second portion and the sensor contact optionally outside of a contact portion coinciding with the sensor trace.

The battery may include an enclosure at least partially surrounding the battery cells. The enclosure may include a canopy extending between first and second support walls where the support walls are disposed on and extending above opposite first and second sides of the battery cells. The substrate may extend through an aperture of the canopy such that the sensor contact corresponds with an outboard portion of the substrate disposed outboard of the canopy and the cell contact corresponds with an inboard portion of the substrate disposed inboard of the canopy.

The sensor contact may be attached with a contact adhesive to an outboard side of the enclosure, resulting in the contact adhesive being on a bottom side of the substrate opposite a top side having the sensor adhesive.

The substrate may be covered with a dielectric layer for electrical isolation.

The battery may include an enclosure at least partially surrounding the battery cells with the substrate being entirely disposed within an interior of the enclosure. In this aspect, the sensor contact may be attached with a contact adhesive to an inboard side of the enclosure and the sensor trace may have a bottom surface pressed against an outboard side of the enclosure.

The present teachings contemplate a battery having a housing where the housing includes a base and a battery cell stack supported on the base. The battery cell stack may include a plurality of battery cells stacked relative to one another along a thickness direction thereof. The housing may also include an enclosure supported on the base. The enclosure may include first and second support walls respectively disposed on opposite first and second sides of the battery cells. The first and second support walls may include a proximal end supported on the base of the housing and a distal end extending away from the base, above the plurality of battery cells. The enclosure may include a canopy extending between the distal ends of the first and second support walls, above the battery cells. The battery may further include a measurement system having a heat spreader and temperature sensor. The heat spreader may be configured to thermally conduct energy through a substrate from a cell contact to a sensor contact. The cell contact may be at a proximal end of the substrate proximate a measured cell of the battery cells. The sensor contact may be at a distal end of the substrate. The temperature sensor may be configured to generate a temperature measurement reflective of a cell temperature of the measured cell according to readings taken proximate the sensor contact.

The temperature sensor may be disposed within the housing outboard of the enclosure.

The temperature sensor may include a sensor trace touching the substrate.

The substrate may extend through an aperture in the enclosure such that the cell contact may correspond with a portion of the substrate inboard of the enclosure and the sensor contact may correspond with a portion of the substrate outboard of the enclosure.

The cell contact may be attached to the measured cell with a cell adhesive, and the sensor contact may be attached to an outboard side of the enclosure with a contact adhesive, such that the substrate is disposed between the sensor trace and the outboard side.

The temperature sensor may include a sensor trace touching an outboard side of the enclosure.

The sensor contact may be attached to an inboard side of the enclosure such that the enclosure is disposed between the sensor trace and the substrate.

The present teachings contemplate a battery having a housing where the housing includes a base and a plurality of battery cells stacked relative to one another therein. An enclosure may be supported on the base, and optionally, include first and second support walls cooperating with a canopy to facilitate physically and thermally isolating the battery cells from components disposed within the housing outside of the enclosure. The battery may further include a measurement system having a heat spreader and temperature sensor. The temperature sensor configured to generate a temperature measurement reflective of a cell temperature of a measured cell of the battery cells according to readings taken through a sensor trace where the sensor trace is outboard of the enclosure. The heat spreader may be configured to thermally conduct energy through a substrate from a cell contact to a sensor contact, optionally with the cell contact being at a proximal end of the substrate attached to the measured cell and the sensor contact being at a distal end of the substrate attached to the enclosure.

The substrate may extend through an aperture in the canopy, optionally with the sensor contact having a bottom side attached with a contact adhesive to an outboard side of the enclosure and the sensor contact having a top side attached with a sensor adhesive to the temperature sensor. The sensor trace may correspondingly touch a surface area of the substrate outside of the sensor adhesive such that the substrate is disposed between the sensor trace and the outboard side.

The substrate may be disposed entirely within an interior of the enclosure, optionally with the sensor contact attaching with a contact adhesive to an inboard side of the enclosure and the temperature sensor attaching with a sensor adhesive to an outboard side of the enclosure, such that the sensor trace touches a surface area of the enclosure outside of the sensor adhesive and the enclosure is disposed between the sensor trace and the sensor contact.

The above features and advantages, and other features and attendant advantages of this disclosure, will be readily apparent from the following detailed description of illustrative examples and modes for carrying out the present disclosure when taken in contact with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure and together with the description, serve to explain the principles of the disclosure.

Figure 1:
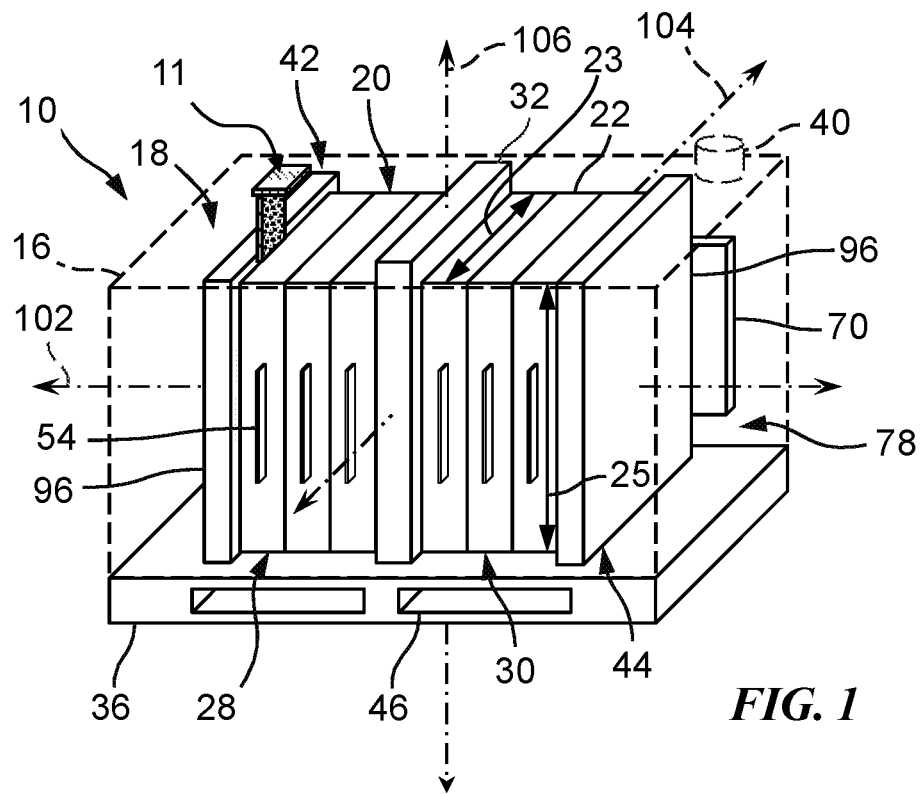
FIG. 1 is a schematic perspective view of a rechargeable battery for an electric vehicle, the battery including a measurement system for measuring temperature.

The appended drawings are not necessarily to scale and may present a somewhat simplified representation of various features of the present disclosure as disclosed herein, including, for example, specific dimensions, orientations, locations, and shapes. Details associated with such features will be determined in part by the particular intended application and use environment.

DETAILED DESCRIPTION

The present disclosure may be embodied in many different forms. Representative examples are shown in the various drawings and described herein in detail as non-limiting representations of the disclosed principles. To that end, elements and limitations described in the Abstract, Introduction, Summary, and Detailed Description sections, but not explicitly set forth in the appended claims, should not be incorporated into the claims, singly or collectively, by implication, inference, or otherwise. Moreover, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation".

Words of approximation such as "about", "almost", "substantially", "generally", "approximately", etc., may be used herein in the sense of "at, near, or nearly at", or "within 0-5% of", or "within acceptable manufacturing tolerances", or logical combinations thereof. Also as used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

In the following text, the term "battery" means a device that includes multiple interconnected electrochemical cells (battery cells) arranged in series and/or parallel and may refer to battery cells that are grouped together, e.g., in stacks, to form battery modules and/or battery packs. The term "vehicle" is predominately noted for exemplary purposes as the contemplated measurement system is similarly applicable to an electrically driven device, including equipment and the like having a need to rely on measuring battery temperatures. Spatially relative terms, such as "inner," "outer," "beneath," "below," "lower," "above," "upper," and the like, may be used herein for ease of description to describe one element or feature's relationship to another element(s) or feature(s) as illustrated in the drawing figures. Spatially relative terms may be intended to encompass different orientations of the device or system in use or operation in addition to the orientation depicted in the drawing figures.

Figure 2:
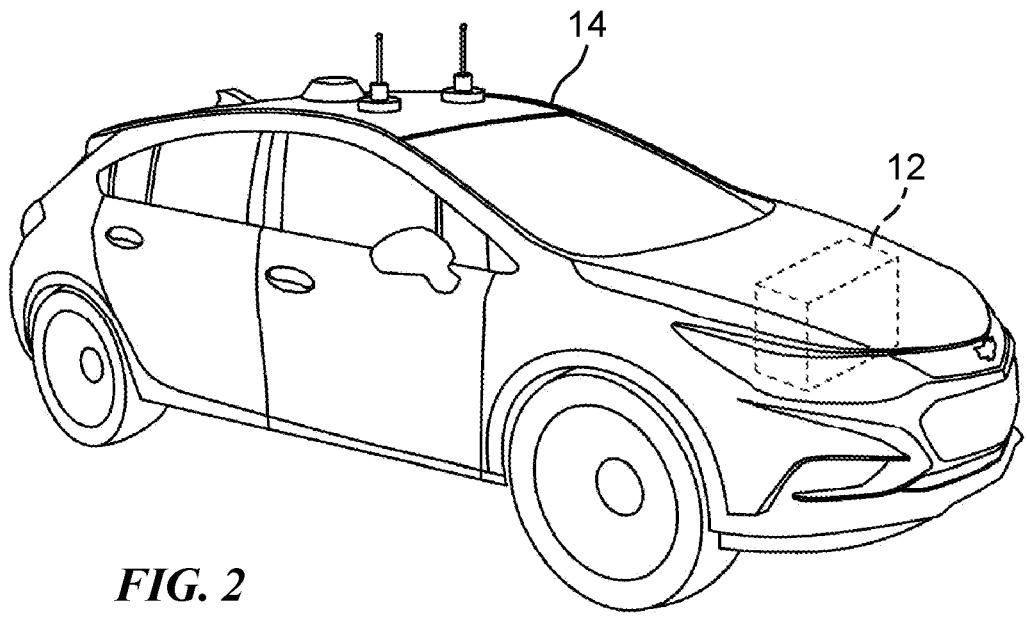
FIG. 2 is a schematic perspective view of an electric vehicle including the rechargeable battery of FIG. 1.
Figure 3:
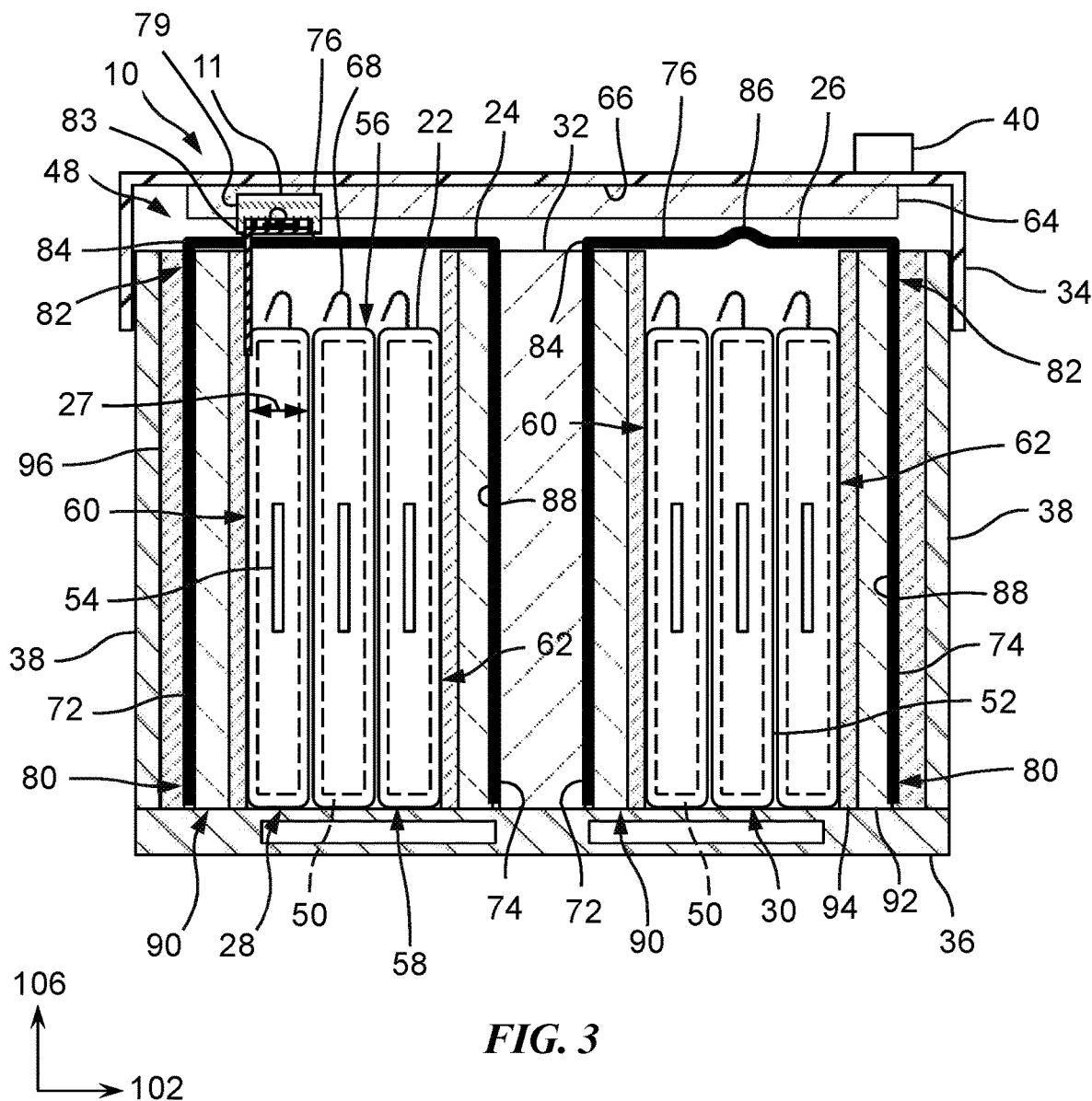
FIG. 3 is a schematic side-sectional view of the rechargeable battery of FIG. 1, the measurement system being disposed relative to a battery enclosure that partially surrounds a battery cell group on three sides.

Referring now to the drawings, wherein like reference numbers refer to like features throughout the several views, FIG. 1 depicts a battery 10 having the contemplated measurement system 11 for measuring battery temperatures. The battery 10 that may be used in an electric power supply 12 of a vehicle 14, such as an electric vehicle (EV) or a hybrid electric vehicle (HEV), as shown in FIG. 2. The battery 10 includes a housing 16 having a longitudinal axis that extends in a longitudinal direction 102. The housing 16 at least partially defines an interior 18 and a battery cell stack 20 is disposed within the interior 18 of the housing 16. The battery cell stack 20 includes multiple battery cells 22 stacked relative to one another along the longitudinal axis of the housing 16. Each of the battery cells 22 has a length 23 extending in a transverse direction 104, perpendicular to the longitudinal direction 102, a height 25 extending in a vertical direction 106, perpendicular to the longitudinal direction 102, and a thickness 27 (FIG. 3) extending in the longitudinal direction 102. The battery cells 22 in the battery cell stack 20 may be stacked relative to one another along a thickness direction thereof, which, in FIGS. 1 and 3, is parallel to the longitudinal direction 102.

The battery cells 22 in the battery cell stack 20 are separated into first and second battery cell groups 28, 30 by a partition 32. As shown in FIG. 3, each of the first and second battery cell groups 28, 30 includes an upper end 56, an opposite lower end 58, a first side 60 and an opposite second side 62. The first and second battery cell groups 28, 30 are physically and thermally isolated from one another by respective first and second enclosures 24, 26 that extend along the first and second sides 60, 62 of the first and second battery cell groups 28, 30 and above the upper ends 56 of the battery cell groups 28, 30. The battery cell stack 20 is shown to include six (6) battery cells 22 that are separated into groups of three (3); however, the number of battery cells 22 in the battery cell stack 20 may be less than or greater than six and/or the number of battery cells 22 in the first battery cell group 28 and/or the second battery cell group 30 may be less than or greater than three. In addition, in FIG. 1, the battery cell stack 20 includes the first and second battery cell groups 28, 30; however, the number of battery cell groups in the battery cell stack 20 may be less than or greater than two, with adjacent pairs of battery cell groups being separated from one another by partitions.

The housing 16 is configured to support the battery cell stack 20 within the vehicle 14 and to protect the battery cell stack 20 from exposure to ambient environmental conditions. As best shown in FIG. 3, the housing 16 includes a top 34, a base 36, and at least one end wall 38 extending between the top 34 and the base 36 of the housing 16. In aspects, a vent 40 may be in the top 34 of the housing 16 that facilitates pressure-induced venting of hot gases and/or particulate matter from the interior 18 of the housing 16. In aspects, the base 36 of the housing 16 may be in the form of a heatsink that is configured to transfer thermal energy (i.e., heat) away from the battery cell stack 20 to a heat transfer fluid (e.g., air or a liquid coolant) during operation of the battery 10. In such case, one or more passageways 46 may be defined in the base 36 of the housing 16 that facilitate a continuous flow of the heat transfer fluid therethrough during operation of the battery 10. A thermally insulating pad 64 may be positioned between the top 34 of the housing 16 and the battery cell stack 20. In aspects, the thermally insulating pad 64 may be carried on an underside 66 of the top 34 of the housing 16. The housing 16 may be made of a thermally conductive material to allow heat to dissipate away from the battery cell stack 20 during operation. The housing 16 may be made of a metal or a polymeric material having high thermal conductivity. For example, the housing 16 may be made of aluminum (Al) and/or copper (Cu). The term "metal," as used herein, refers to materials made of a single elemental metal, as well as materials made of a mixture of two or more elements, wherein at least one of the elements is a metal. The other element(s) may be a non-metal or a different metal.

The battery cell stack 20 includes an upper end 42 adjacent the top 34 of the housing and a lower end 44 supported on and in thermal contact with the base 36 of the housing 16. The battery cell stack 20 is disposed within the interior 18 of the housing 16 such that the battery cell stack 20 is spaced-apart from the top 34 of the housing 16. For example, as best shown in FIG. 3, the battery cell stack 20 is disposed within the interior 18 of the housing 16 such that a plenum 48 is defined between the top 34 of the housing 16 and the upper end 42 of the battery cell stack 20. The battery cell stack 20 may be disposed within the interior 18 of the housing 16 such that the battery cell stack 20 is spaced-apart from a sidewall (not shown) of the housing 16. For example, as shown in FIG. 1, the battery cell stack 20 may be disposed within the interior 18 of the housing 16 such that a gap 78 is defined between a sidewall of the housing 16 and the battery cell stack 20.

Each of the battery cells 22 in the battery cell stack 20 includes an electrode assembly 50 (including a separator sandwiched between a positive electrode and a negative electrode) infiltrated with an electrolyte (not shown) and sealed within a case 52. Electrically conductive positive and negative electrode tabs 54 are electrically coupled to the electrode assembly 50 and extend from the electrode assembly 50 outside the case 52. The case 52 of each of the battery cells 22 may be formed and/or sealed around the electrode assembly 50 by laminating two sheets of polymeric material together along a periphery thereof. After the electrode assembly 50 is sealed within the case 52, the case 52 of each of the battery cells 22 may include a thin and flexible laminated portion 68 that extends along a periphery thereof. To help avoid physical contact between the laminated portion 68 of the case 52 and other adjacent components of the battery 10, the laminated portion 68 may be bent over upon itself, away from the top 34 of the housing 16.

The battery cells 22 may be lithium battery cells. For example, the battery cells 22 may be pouch-type lithium, lithium-ion or alternative chemistry battery cells. In other aspects, the battery cells 22 may be prismatic or can-type lithium-ion battery cells. In assembly, the battery cells 22 of the battery cell stack 20 may be electrically coupled to a battery management system (BMS) 70 (FIG. 1), which may include one or more integrated circuits (ICs) configured to measure certain operating parameters of the battery cells 22 (e.g., cell voltage and/or temperature), to control operation of the battery cells 22 (e.g., charging and discharging), and/or to couple the battery cells 22 to the electric power supply 12 of the vehicle 14 and/or to an external power source. The BMS 70 may be in wired and/or wireless communication with the measurement system 11 to facilitate controlling operations of the battery 10 according to measurements taken therewith. As shown in FIG. 1, in aspects, the battery management system 70 may be positioned within the interior 18 of the housing 16 between the battery cell stack 20 and a sidewall (not shown) of the housing 16. Or the battery management system 70 may be positioned outside of the housing 16 and supported by the top 34 or the end wall 38 of the housing 16.

Referring now to FIG. 3, the first and second enclosures 24, 26 physically and thermally isolate the first and second battery cell groups 28, 30 from one another and from other components of the battery 10. The first and second enclosures 24, 26 partially surround the first and second battery cell groups 28, 30, with the first enclosure 24 extending over the upper end 56 and along the first and second sides 60, 62 of the first battery cell group 28 and the second enclosure 26 extending over the upper end 56 and along the first and second sides 60, 62 of the second battery cell group 30. Each of the first and second enclosures 24, 26 includes a pair of first and second support walls 72, 74 and a canopy 76 that extends between the first and second support walls 72, 74, above the upper ends 56 of the first and second battery cell groups 28, 30. The first and second support walls 72, 74 are respectively disposed on the first and second sides 60, 62 of the first and second battery cell groups 28, 30. Each of the first and second support walls 72, 74 has a proximal end 80 supported on the base 36 of the housing 16 and a distal end 82 extending in a vertical direction 106 away from the base 36, above the battery cells 22.

In FIG. 3, the canopy 76 of each of the first and second enclosures 24, 26 is fixedly attached to the distal ends 82 of the first and second support walls 72, 74. In aspects, flexible joints 84 may be formed between the distal ends 82 of the first and second support walls 72, 74 and the canopy 76 to allow for easy opening and closing of the first and second enclosures 24, 26 during assembly of the battery 10, i.e., during stacking of the battery cells 22 in the battery cell stack 20. Following assembly or stacking of the battery cells 22, or at another suitable point of fabrication, the temperature sensing system 11 may be placed within a cut-out or other relief 79 in the insulating pad 64 and passed, placed, disposed or otherwise inserted through an aperture 83 included within the canopy 76.

Figure 4:
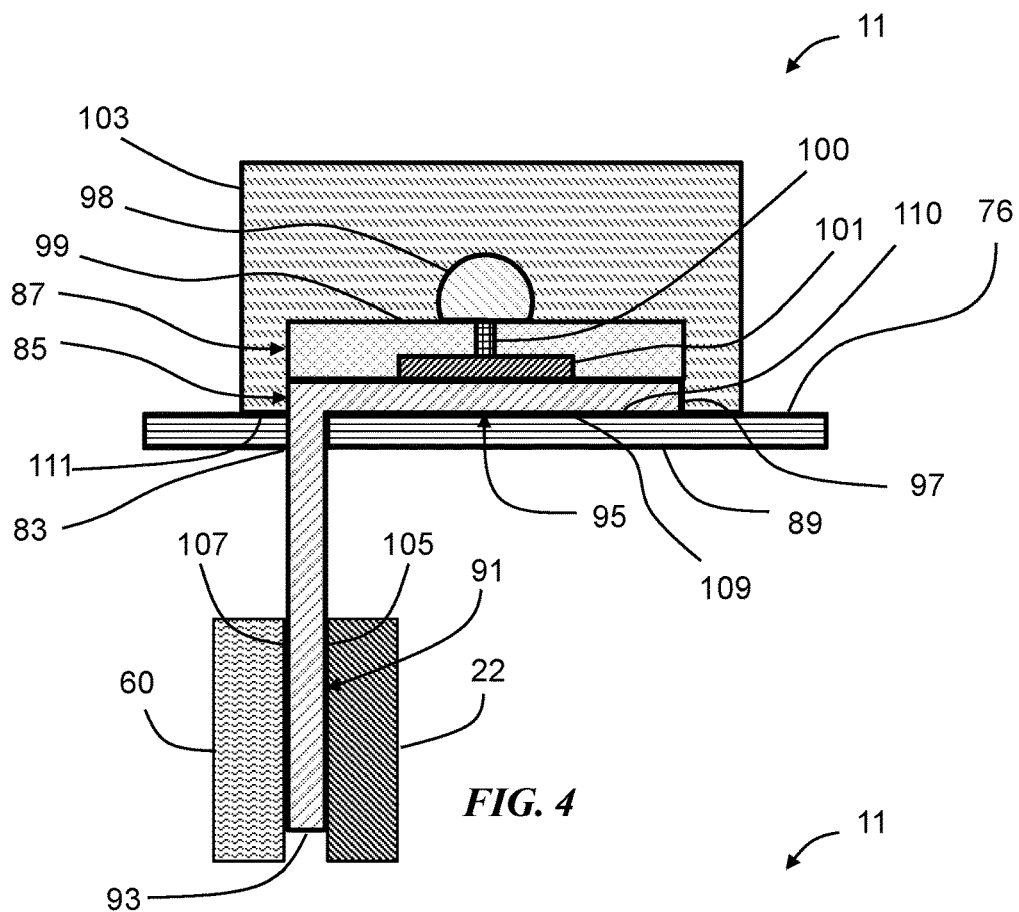
FIG. 4 is a schematic view of a measurement system for the rechargeable battery of FIG. 1, wherein a heat spreader passes through the battery enclosure.

Turning to FIG. 4, the temperature sensing system 11, according to one example, is shown to include a heat spreader 85 and a temperature sensor 87 cooperating to facilitate generating a temperature measurement reflective of a cell temperature of the battery 10.

The heat spreader 85 corresponds with a thermally conductive substrate 89 having capabilities sufficient to facilitate conducting energy from a cell contact 91 at a lower portion near or at a proximal end 93 of the substrate 89 to a sensor contact 95 at an upper portion near or at a distal end 97 of the substrate 89. The heat spreader 85, for example, may be comprised of steel, graphite, graphene, silver or other alloy or material having thermal properties capable of accurately, or within a reasonable tolerance, conveying the heat energy or temperature proximate the cell contact 91 to the sensor contact 95 for a temperature reading. The heat spreader 85 may, optionally, include a dielectric layer (not shown) or other surface coating for electrical isolation and/or to increase or maximize thermal conductivity. In one example, the substrate 89 is entirely coated with a dielectric of the type capable of preventing or essentially eliminating electrical conductivity, which may be beneficial in limiting electricity from passing along its length. The substrate 89 may be comprised of a material that disintegrates or otherwise breaks apart under certain conditions, which, for instance, may be used to prevent reverse thermal conduction in the event of a thermal runaway or another suitable high-temperature condition.

The heat spreader 85 may fit tightly within the canopy aperture 83 in a manner suitable to maintaining a seal of the enclosure 24, or at least with a negligible amount of leakage or leakage within a tolerance effective to essentially seal the battery cells 22 according to the intent herein. A seal or other stuffing material (not shown) may optionally be used in conjunction with the heat spreader 85 to close off the aperture 83 or otherwise facilitate positioning the heat spreader 85 through the enclosure canopy 76 without significant leakage, if any. The heat spreader 85 is shown to have an L-shape for exemplary purposes as it may be provided in various shapes and sizes to facilitate thermally conducting energy along other types of pathways. The shape of the heat spreader 85 may, for example, be dictated by the components and other features associated with the intended usage, and accordingly the shape, size, width, thickness, etc. may correspondingly deviate from that illustrated herein.

The heat spreader 85 shown in FIG. 4 is shaped to enable the temperature affecting the substrate 89 at the cell contact 91 to be transported out of the enclosure 24 to the temperature sensor 87, thereby allowing the temperature sensor 87 to make measurements while being disposed outboard of the enclosure 24, and effectively, beyond the heat, particulates, gases, etc. that may be therein. This, in addition to enabling wiring or other communication mechanisms needed to communicate with the BMS 70 to be similarly shielded from environmental conditions, helps ensure accuracy and sensitivity of the temperature sensor 87 by limiting fluctuations resulting from conditions associated with the battery cell environment. The capability of the substrate 89 to precisely represent the same temperature at both ends 93, 97, as well as the speed at which temperature changes may be communicated from one point to another, may be affected by its shape, length, thickness and width. These parameters may be selected as a matter of design choice on a per application basis, which in some cases may be based on balancing accuracy, precision and speed, i.e., achieving a desirable level of accuracy relative to the speed at which temperature changes may be read and reported to the BMS 70.

The temperature sensor 87 includes a probe 98 to take temperature readings at the sensor contact 95. The probe 98 is illustrated for exemplary purposes as being a thermistor capable of generating electrical impulses or signals as a function of temperature, however, another thermally reactive device could be used. A singular probe 98 is shown also for exemplary purposes, however, multiple probes may be similarly included without deviation from the intent herein, such as to provide redundancy or accuracy maximization. While other configurations may be suitable depending on the nature of the probe 98 being used, the illustrated embodiment utilizes a surface-mount configuration whereby the probe 98 is soldered or otherwise adhered to a top side of a flexible printed circuit (FPC), board or the like 99. In addition to the componentry associated with generating the temperature readings, the FPC 99 may include electronics to facilitate signaling with the BMS 70 and/or to provide other desirable operations.

A leg, conduit, filler or other suitable mechanism 100, optionally having thermally conductive properties, interconnects the probe 98 physically and/or thermally with a sensor trace 101 included on an underside of the FPC 99. The sensor trace 101 may be comprised of a material similar or dissimilar to the substrate 89 and be disposed to include a bottom surface laying flush with or slightly below a bottom of the FPC 99. The sensor trace 101, in this manner, may touch, press or otherwise physically and/or mechanically engage the sensor contact 95 to ultimately facilitate thermal conductivity between the heat spreader 85 and the probe 98. A sensor shield 103, such as one constructed of foam or other thermally insulative material, is disposed over top of the probe 98 and FPC 99 and is generally characterized as including a first portion coinciding with the area above the FPC 99 and a second portion coinciding with the area around and below the FPC 99.

The temperature sensor 87 and the heat spreader 85 may be attached to each other, the enclosure canopy 76, the side 60 and/or the battery cell 22 with an adhesive, such as a thermally conductive glue, tape, etc. Fasteners, clamps, clips or other attachment elements may similarly be employed and helpful in maintaining the desired thermal connection between the temperature probe 87 and the battery cell 22 depending on the intended usage of the battery 10, e.g., while the adhesive is believed to be sufficient for many environments, the use thereof may be replaced and/or augmented with additional fasteners if warranted by the intended environment of application. The use of an adhesive may be of assistance in easing manufacturability insofar as the substrate 89 may be manufactured into a planar or flat state, coated with the dielectric and/or adhesive, optionally with the adhesive being applied to the entire substrate or just to the areas noted herein, whereafter the substrate 89 may be bent or shaped into the desired configuration, which in the case of the illustrated L-shape may be achieved with a single fold of the substrate 89.

In the illustrated adhesive-based attachment, a cell adhesive is applied to a first side 105 and/or a second side 107 of the cell contact 91, a contact adhesive is applied between a bottom 109 of the sensor contact 95 and a top side 110 of the enclosure canopy 76, and a sensor adhesive is applied between a bottom 111 of the second portion of the sensor shield 103 and the top 110 of the canopy 76. The sensor shield 103 may be shaped to exert force on the top and/or sides of the probe/FPC 98, 99, in a manner, which when coupled with the sensor adhesive, is sufficient to maintain the sensor trace 101 in contact with the substrate without requiring adhesive under the sensor trace 101 and/or under the FPC 99.

An adhesive (not labeled) may be included between the sensor shield 103 and the probe/FPC 98, 99, or the sensor shield 103 may be vacuumed formed thereover, to provide an integrated or singular part that may be attached by simply pressing the sensor adhesive on the bottom portion 111 against the enclosure canopy 76. While the heat spreader 85 could be included as part of the integration, the ability to provide the temperature sensor 87 without adhering it to the heat spreader 85 allows the system 11 to be constructed effectively as two-components. The two-component configuration permits the heat spreader 85 to be inserted through the aperture 83 before the temperature sensor 87 is applied thereafter, which may simplify passing the substrate 89 through the aperture 83, and thereby, manufacturability.

Figure 5:
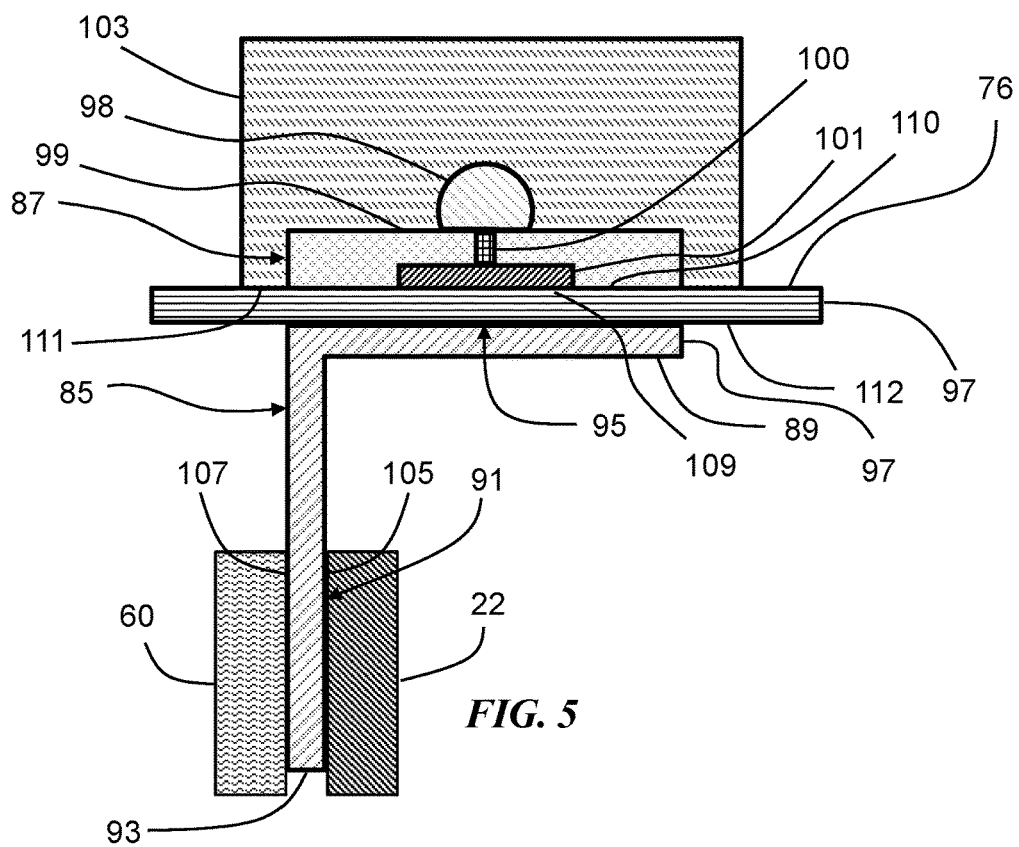
FIG. 5 is a schematic view of the measurement system for the rechargeable battery of FIG. 1, wherein the heat spreader is disposed entirely within the battery enclosure.

Turning to FIG. 5, the temperature sensing system 11, according to one example, is shown to include the heat spreader 85 disposed on an inboard side 112 of the canopy 76 within an interior of the enclosure 24. Consequently, in this configuration, the sensor trace 101 presses against the canopy 76 to take the temperature reading through a material of the enclosure 24 instead of directly from the substrate 89 as done in the example of FIG. 4 where the sensor trace 101 instead presses against the substrate 89. The enclosure 24 may be comprised of thermally conductive material having properties suitable to the transference of heat/temperature from the inboard side 112 in touch with the sensor contact 95 to the outboard side 110 in touch with the sensor trace 101. In the event the enclosure 24 includes a thermally resistant coating or other type of coating thwarting thermal conductivity, the coating may be removed or omitted from a portion of the enclosure 24 coinciding with sensor contact 95 and/or the sensor trace 101. This type of interior or sealed configuration allows the temperature sensing system 11 to be implemented without requiring an aperture through the enclosure and without otherwise affecting the sealing properties provided by the enclosure 24 or other components of the battery.

The first and second enclosures 24, 26 may be of unitary, one-piece construction. In such case, the first and second enclosures 24, 26 may be formed from a single sheet of material and bent into the desired shape of the first and second enclosures 24, 26. The first and second enclosures 24, 26 may be made of a rigid, structural material that is capable of retaining its physical shape and mechanical strength when exposed to high temperatures, e.g., temperatures experienced during a thermal runaway event. The first and second enclosures 24, 26 may be made of a material that is capable of being formed into the shape of the first and second enclosures 24, 26, for example, by bending. The first and second enclosures 24, 26 may be made of metal, e.g., stainless steel. In aspects where the first and second enclosures 24, 26 are made of an electrically conductive material (e.g., metal), exterior surfaces of the first and second enclosures 24, 26 may be laminated or coated with a layer of electrically insulating material.

The canopy 76 of the first enclosure 24 is substantially flat. On the other hand, the canopy of the second enclosure 26 includes a corrugation 86. Formation of one or more corrugations 86 in the canopy 76 of the first or second enclosure 24, 26 may allow the canopy 76 to stretch in the longitudinal direction 102 at the corrugation 86 to accommodate increases in the thickness 27 of one or more of the battery cells 22 over the life of the battery 10. In the event a compressive force is exerted on the first and second support walls 72, 74 in the longitudinal direction 102, the corrugation 86 may help the second enclosure 26 to absorb the force, for example, by allowing the second enclosure 26 to compress in the longitudinal direction 102 at the corrugation 86.

The proximal ends 80 of the first and second support walls 72, 74 may be biased toward each other. In such case, the first and second support walls 72, 74 may exert pressure in the longitudinal direction 102 respectively on the first and second sides 60, 62 of the first and second battery cell groups 28, 30, which may assist in stacking of the battery cells 22 in the battery cell stack 20 during assembly of the battery 10. In aspects where the first and second enclosures 24, 26 are made of metal, the first and second support walls 72, 74 may be biased toward each other by the inherent tensile and compressive stresses imparted on the metal when the metal is bent from a flat sheet to the shape of the first and second enclosures 24, 26.

Laminate structures 90 may be disposed along inner surfaces 88 of the first and second support walls 72, 74, between the first and second support walls 72, 74 and the first and second sides 60, 62 of the first and second battery cell groups 28, 30. Each of the laminate structures 90 may include a thermally insulating layer 92 disposed on the inner surface 88 of the first or second support wall 72, 74 and a compression layer 94 disposed on the first or second support wall 72, 74 over the thermally insulating layer 92. In aspects, the laminate structures 90 disposed on the inner surfaces 88 of the first and second support walls 72, 74 may include one or more additional layers and or different materials, as desired.

The partition 32 may provide a thermal and physical barrier between the first and second battery cell groups 28, 30 and may be made of a thermally insulating material. Compression pads 96 may be disposed on opposite ends of the battery cell stack 20, between the end walls 38 and the first and second enclosures 24, 26. The compression pads 96 may provide a layer of cushioning between the battery cell stack 20 and the end wall 38 of the housing 16 and may help protect the battery cells 22 from external forces, assist during assembly of the battery cell stack 20, and/or help compensate for volumetric changes in the battery cells 22 over the life of the battery 10. The size (i.e., the length and height) of the laminate structures 90, the partition 32, and the compression pads 96 may be commensurate with or larger than the length 23 and the height 25 of the facing surfaces of the battery cells 22 to help ensure even pressure distribution along the facing surfaces thereof.

During a thermal runaway event, the first and second enclosures 24, 26 may inhibit propagation of thermal runaway temperatures throughout the battery 10. For example, in aspects, the first and second enclosures 24, 26 may help contain hot gases and/or particulate matter emitted from the first and/or second battery cell groups 28, 30 within the first and second enclosures 24, 26. In addition, the first and second enclosures 24, 26 may help direct emissions from the first and/or second battery cell groups 28, 30 in a transverse direction 104 toward the gap 78 between the battery cell stack 20 and the sidewall of the housing 16. In aspects, emissions the first and/or second battery cell groups 28, 30 may be directed in the transverse direction 104 toward the vent 40 in the top 34 of the housing 16.

Figure 6:
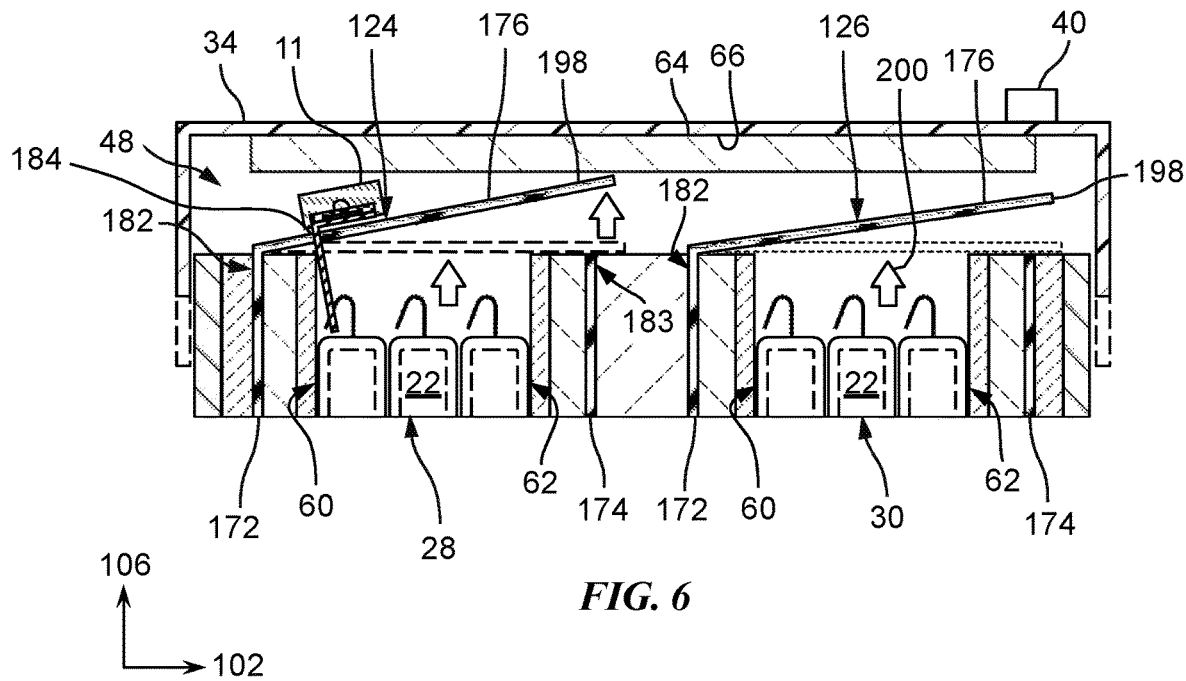
FIG. 6 is a schematic side-sectional view of the rechargeable battery of FIG. 1, the measurement system being disposed relative to a hingedly coupled canopy of the battery enclosure.

Referring now to FIG. 6, in aspects, the battery 10 may include the measurement system 11 positioned through an aperture 184 within one of a pair of first and second dynamic enclosures 124, 126. The first and second dynamic enclosures 124, 126 are similar in many respects to the first and second enclosures 24, 26 depicted in FIGS. 1 and 3, and a description of common subject matter generally may not be repeated here. Each canopy 176 of the first and second dynamic enclosures 124, 126 is hingedly coupled to the distal end 182 of the first support wall 172 and has a free end 198 that is configured to pivot about the distal end 182 of the first support wall 172 to transition the canopy 176 from a closed position (dashed lines) to an open position. When the canopy 176 transitions from the closed position to the open position, the measurement system 11 may move with the canopy.

Figure 7:
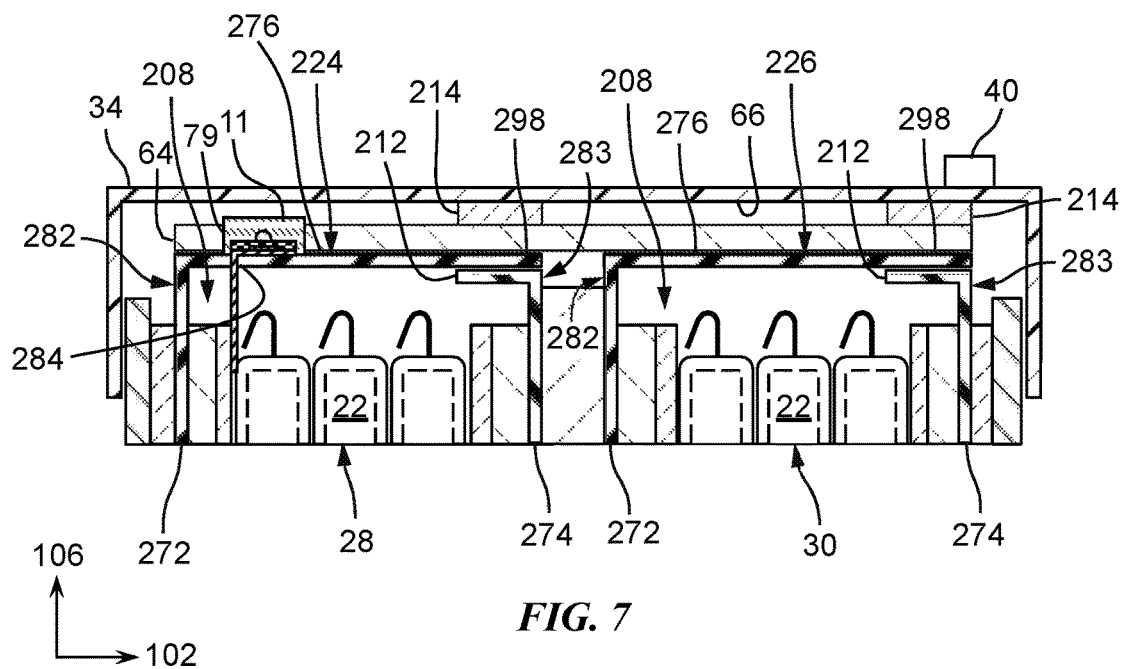
FIG. 7 is a schematic side-sectional view of the rechargeable battery of FIG. 1, the measurement system being disposed relative to the hingedly coupled canopy cooperating with a cantilever of the battery enclosure.

Referring now to FIG. 7, in aspects, the battery 10 may include the measurement system 11 positioned through an aperture 284 of one of a pair of first and second dynamic enclosures 224, 226. The first and second dynamic enclosures 224, 226 are similar in many respects to the first and second dynamic enclosures 124, 126 depicted in FIG. 6, and a description of common subject matter generally may not be repeated here. Each of the first and second dynamic enclosures 224, 226 includes a pair of first and second support walls 272, 274 and a canopy 276 that together define an inner chamber 208. The first and second support walls 272, 274 of the first and second dynamic enclosures 224, 226 have proximal ends (not shown) supported on the base 36 of the housing 16 and respective distal ends 282, 283 extending in a vertical direction 106 toward the top 34 of the housing 16, above the battery cells 22. Each canopy 276 of the first and second dynamic enclosures 224, 226 is hingedly coupled to the distal end 282 of the first support wall 272 and has a free end 298 that is configured to pivot about the distal end 282 of the first support wall 272 to transition the canopy 276 from a closed position (FIG. 7) to an open position (not shown).

In FIG. 7, the distal end 283 of each of the second support walls 274 includes a cantilever 212 that is oriented in a horizontal position and extends in a longitudinal direction 102 from the distal end 283 of the second support wall 274 toward the first support wall 272. When the canopy 276 is in the closed position, the canopy 276 may overlap the cantilever 212. The cantilever 212 may be configured to support the free end 298 of the canopy 276 when the canopy 276 is in the closed position. To help direct forces exerted on the top 34 of the housing 16 to the first and second support walls 172, 174, a spacer 214 may be positioned between the cantilever 212 and the top 34 of the housing 16. For example, as shown in FIG. 7, the spacer 214 may be positioned in vertical alignment with the cantilever 212 between the underside 66 of the top 34 of the housing 16 and the thermally insulating pad 64. Additional or alternatively, the spacer 214 may be positioned in vertical alignment with the cantilever 212 and disposed between the thermally insulating pad 64 and the canopy 276.

In aspects, the cantilever 212 may be hingedly coupled to the distal end 283 of the second support wall 274 and may be configured to pivot about the distal end 283 of the second support wall 274 to transition from a closed position (FIG. 7) to an open position (not shown). In such case, the length of the cantilever 212 may be selected to control the amount of emissions released from the inner chamber 208 when the canopy 276 and the cantilever 212 are in the open position. In aspects, the cantilever 212 may be fixedly attached to the free end 298 of the canopy 276 after assembly of the battery cell stack 20, for example, using an adhesive.

Figure 8:
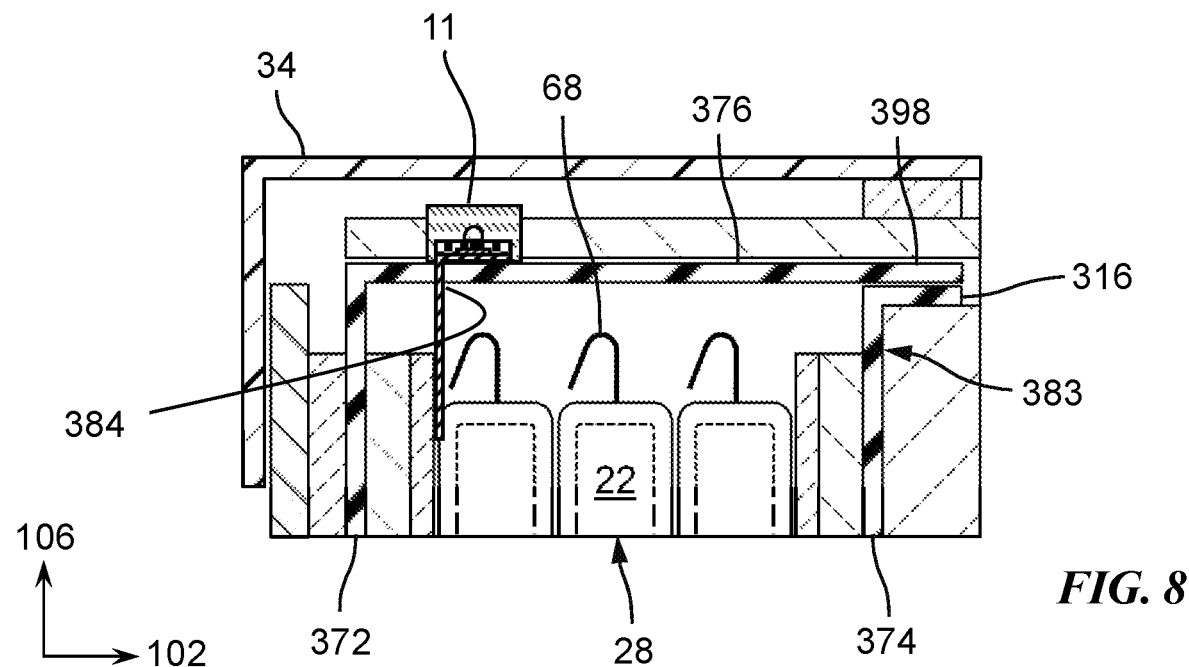
FIG. 8 is a schematic side-sectional view of the rechargeable battery of FIG. 1, the measurement system being disposed relative to the hingedly coupled canopy cooperating with a flange of the battery enclosure.
Figure 9:
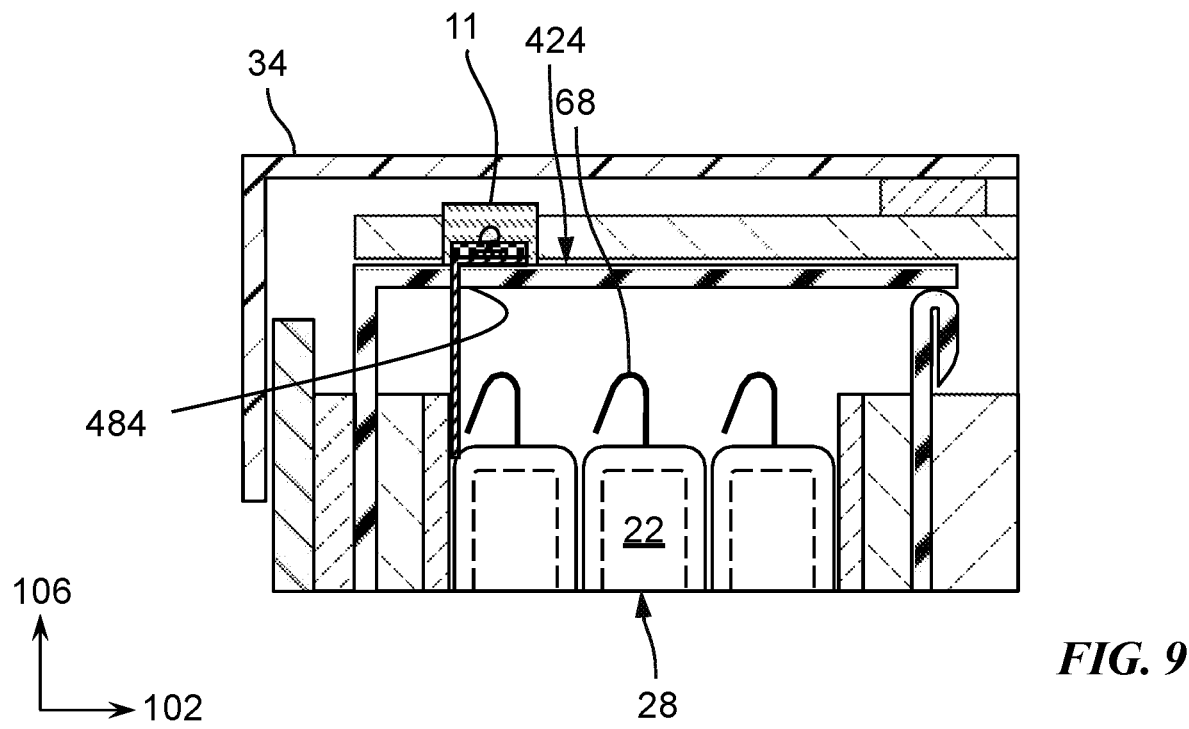
FIG. 9 is a schematic side-sectional view of the rechargeable battery of FIG. 1, the measurement system being disposed relative to the hingedly coupled canopy of cooperating with a hemmed end of the battery enclosure.

In FIG. 8, the battery 10 may include the measurement system 11 positioned through an aperture 384. The distal end 383 of the second support wall 374 includes a flange 316 that is oriented in a horizontal position and extends in a longitudinal direction 102 from the distal end 383 of the second support wall 374 away from the first support wall 372. The flange 316 may be configured to support the free end 398 of the canopy 376 when the canopy 376 is in the closed position and, in assembly, may allow for additional vertical clearance above the laminated portions 68 of the battery cells 22. In FIG. 9, in aspects, the battery 10 may include the measurement system 11 positioned through an aperture 484 of one or more dynamic enclosures 424.

As described above, a measurement system is configured to facilitate generating a cell temperature for a battery cell disposed within a variety of enclosures. While the Figures show a singular temperature management system in each illustration, multiple measurement systems may be included, i.e., additional sensors may be included to measure temperature for additional battery cells within the same battery group and/or additional battery groups of the battery. The heat spreader is shown to interconnect the temperature sensor with a single battery cell, however; the heat spreader could also be configured to interact the temperature sensor with multiple battery cells or battery cell groups, which may optionally include adding a separate probe for each additional battery cell. The heat spreader is shown to provide a physical contact or touching between itself and the battery cell being measured, which may be helpful in sensing a portion of the battery cell reflective of true temperature, e.g., the housing of the battery cell. The heat spreader, however, need not necessarily touch or otherwise physically engage a battery cell as it could be positioned in non-contacting manner, i.e., in close proximity to a battery cell, or farther away from the battery cell, such as to generate a reading of the ambient environment as opposed to taking a reading directly from a physical element.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A cell temperature measurement system for a battery comprising:
   a heat spreader configured to thermally conduct energy through a substrate from a cell contact to a sensor contact, the sensor contact being at a distal end of the substrate and the cell contact being at a proximal end of the substrate;
   a temperature sensor configured to generate a temperature measurement reflective of a cell temperature of the battery, the temperature sensor having a probe proximate the sensor contact, the temperature sensor generating the temperature measurement according to readings taken with the probe;
   wherein the battery includes a plurality of battery cells stacked relative to one another;
   wherein the cell contact is attached with a cell adhesive to a housing of at least one of the battery cells
   wherein the probe is a thermistor surface mounted to a top of a circuit board, the circuit board having an underside with a sensor trace exposed therethrough, the sensor trace being thermally coupled to the thermistor, the sensor trace having a bottom surface pressed against the sensor contact;
   wherein the sensor contact is attached to a sensor shield with a sensor adhesive, the sensor shield including a first portion covering the circuit board and the thermistor, the sensor shield including a second portion surrounding the first portion, the sensor adhesive being attached between the second portion and the sensor contact outside of a contact portion coinciding with the sensor trace;
   wherein the battery includes an enclosure at least partially surrounding the battery cells, the enclosure including a canopy extending between first and second support walls, the first and second support walls being respectively disposed on and extending above opposite first and second sides of the battery cells; and
   wherein the substrate extends through an aperture of the canopy, the sensor contact corresponding with an outboard portion of the substrate disposed outboard of the canopy, the cell contact corresponding with an inboard portion of the substrate disposed inboard of the canopy.

2. The system according to claim 1 wherein the canopy is hingedly coupled to the first support wall and has a free end proximate the second support wall.

3. The system according to claim 2 wherein the free end is configured to pivot about the first support wall to transition the canopy from a closed position to an open position.

4. The system according to claim 1 wherein:
   the battery cells are configured for storing and supplying electrical power for an electric motor of a vehicle; and
   the temperature sensor is configured to provide the temperature measurement to a battery management system (BMS) of the vehicle.

5. The system according to claim 1 wherein the sensor contact is attached with a contact adhesive to an outboard side of the enclosure, the contact adhesive being on a bottom side of the substrate opposite a top side having the sensor adhesive.

6. The system according to claim 5 wherein the substrate is covered with a dielectric layer for electrical isolation.

7. The system according to claim 6 wherein the substrate is comprised of a material that disintegrates or otherwise breaks apart to prevent reverse thermal conduction in the event of a thermal runaway or another suitable high-temperature condition.

8. The system according to claim 7 wherein the heat spreader is configured to fit tightly within the aperture to close off the enclosure.

9. The system according to claim 8 further comprising a seal or a stuffing material configured to fit tightly within the aperture to close off the aperture.

10. A battery comprising:
    a housing including a base;
    a battery cell stack supported on the base of the housing, the battery cell stack including a plurality of battery cells stacked relative to one another along a thickness direction thereof;
    an enclosure supported on the base of the housing, the enclosure including:
    i) first and second support walls respectively disposed on opposite first and second sides of the battery cells, each of the first and second support walls including a proximal end supported on the base of the housing and a distal end extending away from the base, above the plurality of battery cells; and
    ii) a canopy extending between the distal ends of the first and second support walls, above the battery cells; and
    a measurement system including:
    i) a heat spreader configured to thermally conduct energy through a substrate from a cell contact to a sensor contact, the cell contact being at a proximal end of the substrate proximate a measured cell of the battery cells, the sensor contact being at a distal end of the substrate; and ii) a temperature sensor configured to generate a temperature measurement reflective of a cell temperature of the measured cell, the temperature sensor generating the temperature measurement according to readings taken proximate the sensor contact wherein the temperature sensor is disposed within the housing outboard of the enclosure;

wherein the temperature sensor includes a sensor trace touching the substrate, the temperature sensor takin the readings through the sensor trace; and wherein the substrate extends through an aperture in the enclosure, the cell contact corresponding with a portion of the substrate inboard of the enclosure, the sensor contact corresponding with a portion of the substrate outboard of the enclosure.

11. The system according to claim 10 wherein the substrate is comprised of a material that disintegrates or otherwise breaks apart to prevent reverse thermal conduction in the event of a thermal runaway or another suitable high-temperature condition.

12. The system according to claim 11 further comprising a seal or a stuffing material configured to fit tightly within the aperture to close off the aperture.

13. The system according to claim 10 wherein the canopy is hingedly coupled to the first support wall and has a free end proximate the second support wall.

14. The system according to claim 13 wherein:
the battery cells are configured for storing and supplying electrical power for an electric motor of a vehicle; and
the temperature sensor is configured to provide the temperature measurement to a battery management system (BMS) of the vehicle.

15. The battery according to claim 10 wherein the cell contact is attached to the measured cell with a cell adhesive and the sensor contact is attached to an outboard side of the enclosure with a contact adhesive, the substrate being disposed between the sensor trace and the outboard side.

16. A battery comprising:
a housing including a base;
a plurality of battery cells stacked relative to one another within the housing along the base;
an enclosure supported on the base, the enclosure including first and second support walls cooperating with a canopy to facilitate physically and thermally isolating the battery cells from components disposed within the housing outside of the enclosure;
a measurement system including:
i) a temperature sensor configured to generate a temperature measurement reflective of a cell temperature of a measured cell of the battery cells, the sensor generating the temperature measurement according to readings taken through a sensor trace, the sensor trace being outboard of the enclosure; and
ii) a heat spreader configured to thermally conduct energy through a substrate from a cell contact to a sensor contact, the cell contact being at a proximal end of the substrate attached to the measured cell, the sensor contact being at a distal end of the substrate attached to the enclosure; and
wherein the substrate extends through an aperture in the canopy, the sensor contact having a bottom side attached with a contact adhesive to an outboard side of the enclosure, the sensor contact having a top side attached with a sensor adhesive to the temperature sensor, the sensor trace touching a surface area of the substrate outside of the sensor adhesive, the substrate being disposed between the sensor trace and the outboard side.

17. The system according to claim 16 wherein the substrate is comprised of a material that disintegrates or otherwise breaks apart to prevent reverse thermal conduction in the event of a thermal runaway or another suitable high-temperature condition.

18. The system according to claim 16 wherein the heat spreader is configured to fit tightly within the aperture to close off the enclosure.

19. The system according to claim 16 wherein the canopy is hingedly coupled to the first support wall and has a free end proximate the second support wall.

20. The system according to claim 16 wherein:
the battery cells are configured for storing and supplying electrical power for an electric motor of a vehicle; and
the temperature sensor is configured to provide the temperature measurement to a battery management system (BMS) of the vehicle.

* * * * *